United States Patent
Daul

(10) Patent No.: US 12,276,367 B2
(45) Date of Patent: Apr. 15, 2025

(54) FLEXIBLE CONDUIT FOR CONTROL CABLE HAVING FLAME RETARDANT OUTER SLEEVE

(71) Applicant: ITT Manufacturing Enterprises LLC, Wilmington, DE (US)

(72) Inventor: Terrance E. Daul, Hamburg, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 176 days.

(21) Appl. No.: 18/081,994

(22) Filed: Dec. 15, 2022

(65) Prior Publication Data

US 2024/0200712 A1 Jun. 20, 2024

(51) Int. Cl.
*F16L 59/14* (2006.01)
*B64D 11/06* (2006.01)
*F16L 7/00* (2006.01)
*F16L 59/153* (2006.01)

(52) U.S. Cl.
CPC .......... *F16L 59/145* (2013.01); *B64D 11/064* (2014.12); *F16L 7/00* (2013.01); *F16L 59/153* (2013.01)

(58) Field of Classification Search
CPC ......... F16L 59/145; F16L 7/00; F16L 59/153; B64D 11/064; F16C 1/00
USPC ............................................. 74/500.5, 502.6
See application file for complete search history.

(56) References Cited

U.S. PATENT DOCUMENTS

| | | | | |
|---|---|---|---|---|
| 3,063,303 A | * | 11/1962 | Cadwallader | F16C 1/26 74/DIG. 10 |
| 3,263,519 A | * | 8/1966 | Conrad | F16C 1/262 138/109 |
| 9,481,466 B2 | | 11/2016 | Fischer et al. | |
| 10,829,223 B2 | | 11/2020 | Senneff et al. | |
| 2008/0121171 A1 | * | 5/2008 | Hulsey | G02B 6/443 374/E11.018 |
| 2010/0173109 A1 | * | 7/2010 | Okabe | B32B 27/32 524/394 |
| 2012/0040138 A1 | * | 2/2012 | Weidinger | F16L 59/153 252/62 |
| 2012/0186684 A1 | * | 7/2012 | Giovannetti | B29D 23/001 138/137 |

(Continued)

FOREIGN PATENT DOCUMENTS

| | | | | |
|---|---|---|---|---|
| EP | 0329455 A1 | * | 8/1989 | ............. A47C 1/024 |
| EP | 0796576 A1 | * | 9/1997 | ............. A47C 1/024 |
| WO | WO 2017078795 A1 | * | 5/2017 | ............... B60N 2/22 |

OTHER PUBLICATIONS

Extrusion shrinkage, Microsoft Bing, Oct. 20, 2024 (Year: 2024).*
Is polyolefin an organic plastic?, Microsoft Bing, Oct. 20, 2024 (Year: 2024).*

*Primary Examiner* — Vinh Luong
(74) *Attorney, Agent, or Firm* — Barclay Damon LLP

(57) ABSTRACT

A flexible conduit or sleeve sized for surrounding and supporting a movable wire rope includes an inner core having an opening for receiving the movable wire rope, a plurality of wires disposed about the inner core, and an outer sleeve. The outer sleeve is made from a polymer material having a flame retardant additive that provides sufficient flexibility while also improving manufacturability for use in various applications, such as part of an aircraft seat adjustment mechanism.

5 Claims, 7 Drawing Sheets

(56) References Cited

U.S. PATENT DOCUMENTS

| | | | | |
|---|---|---|---|---|
| 2015/0072093 A1* | 3/2015 | Zhang | ................. | B29B 7/72 |
| | | | | 264/293 |
| 2016/0245451 A1* | 8/2016 | Okada | ................. | F16L 11/12 |
| 2019/0135439 A1* | 5/2019 | Senneff | ................. | B60N 2/02 |
| 2019/0300175 A1* | 10/2019 | Wilkey | ................. | B60N 2/231 |
| 2021/0102733 A1* | 4/2021 | Stahl | ................. | B60N 2/5628 |
| 2021/0364121 A1* | 11/2021 | Pilone | ................. | F16L 59/147 |

* cited by examiner

FLEXIBLE CONDUIT FOR CONTROL CABLE HAVING FLAME RETARDANT OUTER SLEEVE

TECHNICAL FIELD

This application relates generally to the field of mechanical control systems using control cables for use in various applications, such as, for example, aircraft seat adjustment mechanisms. More specifically, this application is directed to a conduit for a control cable, the conduit having a flexible and flame retardant outer sleeve.

BACKGROUND

Control cables are well known for use in various uses and applications. Among such applications are aircraft seat adjustment mechanisms, such as those described, for example, in U.S. Pat. Nos. 9,481,466 and 10,829,223. The former patent describes a control assembly for a powered aircraft seat equipped with a number of mechanisms for selectively controlling various adjustable features such as the position of the back support, the seat and the foot/leg rest. The latter patent describes a mechanical control mechanism that is provided on an arm rest of an aircraft seat, the control mechanism including an actuable push button linked to a control cable and actuator and configured for selectively reclining the aircraft seat.

A control cable typically includes a conduit that surrounds and retains the movable cable component. The movable cable is linked to an actuator or other driving mechanism with the movable cable component being housed within the conduit in order to suitably provide a durable and protective covering.

Fires in aircraft cabins are particularly hazardous given the small size of the cabin compartments and the impossibility or difficulty to escape. In aircraft, post crash cabin fires ignited from spilled jet fuel become life-threatening when the cabin materials become involved and the fire propagates through the cabin, generating heat as well as toxic decomposition products. The availability of air can strongly influence the products of combustion as well as the fire's intensity. Moreover and as oxygen becomes depleted during combustion, the amount of carbon monoxide in the smoke increases, thereby becoming the main or primary toxicant in a fire.

Industry wide safety standards have been instituted for materials presently used on aircrafts. These standards, such as those set forth in Code of Federal Regulations (CFR), Part 25, among others, have become more stringent over time. These more stringent standards set forth after about 2013 now affects additional materials used on aircrafts, including cabling used in aircraft adjustment assemblies in terms of flame resistance.

The manufacture and use of control cable assemblies that are able to meet the more stringent standards is challenging. For example, the required inclusion of flame resistant or flame retardant additives to the conduits or sleeves of previously known control cables, typically those made from a nylon or a similar material, has resulted in a comparative decrease in overall flexibility. Given the amount of movement possible when adjusting the seat position, a considerable length of cable/conduit is typically stored in the arm rest of the aircraft seat. The decrease in overall flexibility can produce cracking of the conduit or other fatigue related issues over time.

It has also been found that the inclusion of flame retardant additives in the outer sleeve of the conduit creates voids and other imperfections, which makes extrusion molding of the sleeve quite difficult, and inevitably resulting in a high failure rate during manufacture.

Accordingly, there is a need in the field to provide a conduit for a control cable that can effectively meet the current flame resistance standards imposed by the industry, but at the same time is also sufficiently flexible and manufacturable in order to promote a long service life.

BRIEF DESCRIPTION

Therefore and according to at least one aspect, there is provided a control cable having a conduit surrounding and supporting a movable wire rope. The conduit comprises an inner core having an opening for receiving the movable wire rope, a plurality of support wires disposed about the inner core, and an outer sleeve covering the plurality of support wires and the inner core, in which the outer sleeve is made from a polymer material having a flame retardant additive.

According to at least another aspect, there is provided a control mechanism comprising at least one actuable member coupled to a control cable, the control cable including a conduit sized for surrounding and supporting a movable wire rope. The conduit comprises an inner core having an opening sized for receiving the movable wire rope, a plurality of support wires disposed about the inner core, and an outer sleeve covering the plurality of support wires and inner core, wherein the outer sleeve is made from a polymer material having a flame retardant additive.

According to yet at least another aspect, there is provided an assembly for controlling the position of an aircraft seat, the assembly comprising a seat, an arm rest, and a control mechanism having at least one user-actuable control disposed on the arm rest and coupled to a control cable. The control cable includes a conduit sized for surrounding and supporting a movable wire rope linked to the user-actuable control, in which the conduit comprises an inner core including a through opening sized for receiving the movable wire rope, a plurality of support wires disposed about the inner core, and an outer sleeve disposed about the plurality of support wires and the inner core, wherein the outer sleeve is made from a polymer material having a flame retardant additive.

According to at least one version, the outer sleeve of the conduit is made from a polyolefin that includes a flame resistant and preferably a self-extinguishing additive.

Advantageously, the conduit of a control cable made in accordance with the present invention exhibits improved flexibility while still having flame retardant characteristics that enables use of the control cable for a number of varied applications, including use in control mechanisms configured for selectively adjusting the position(s) of an aircraft seat.

The herein described conduit is more robust than those previously made in accordance with flame resistance standards and is also capable of being extrusion molded without imperfections.

These and other features and advantages will be readily apparent from the following Detailed Description, which should be read in conjunction with the accompanying drawings.

DETAILED DESCRIPTION

The following describes a control cable assembly and more specifically a flexible conduit for a control cable made in accordance with an exemplary embodiment. The control cable assembly, as discussed herein, can be utilized in an aircraft seat adjustment assembly having one or more mechanical control mechanisms. It will be understood, however, that the described conduit can be used in a number of varied applications for other purposes, such as, but not limited to pneumatic, hydraulic and electrical systems. The herein described invention can be used in connection with any movable control cable disposed within a static conduit and most preferably any position transmission system utilizing a pull-pull mechanical control cable.

The accompanying drawings are intended to depict salient features of the present invention, but are not intended to be to scale. Accordingly, a reader should not rely on the accompanying drawings for scaling purposes. Additionally, a number of terms are used throughout this description for the purposes of providing an adequate frame of reference in regard to the accompanying drawings. These terms, which include "distal", "proximal", "inner", "outer", "upper", "lower" and the like should not be interpreted as limiting the intended scope of the invention, unless specifically indicated.

Figure 1:
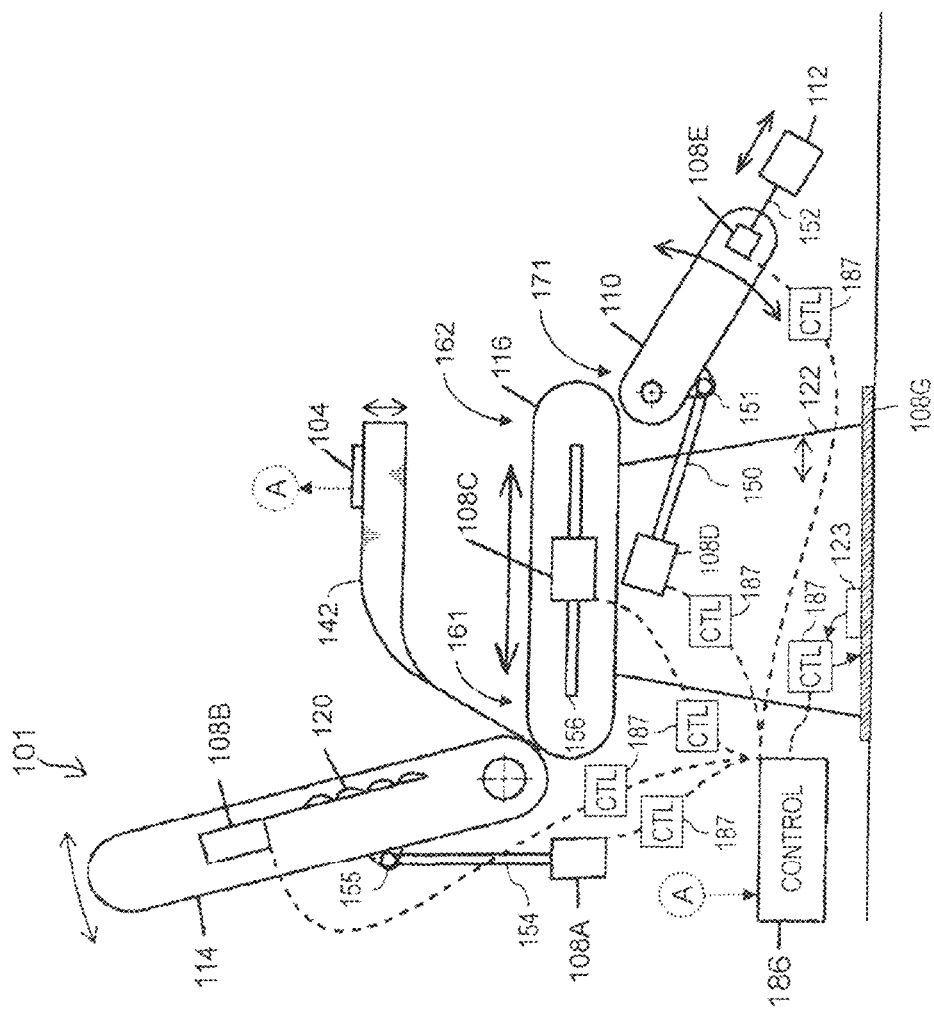
FIG. 1 is a schematic view of a known assembly for controlling a number of different aspects of an aircraft seat.
Figure 2A:
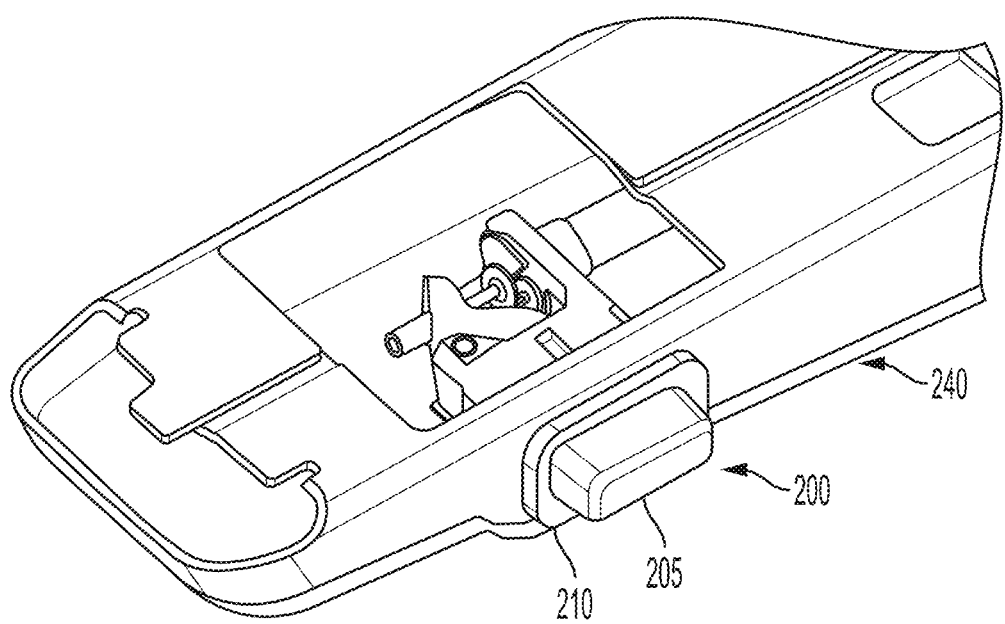
FIG. 2(a) is a side perspective view of a button assembly as mounted in an aircraft seat.
Figure 2B:
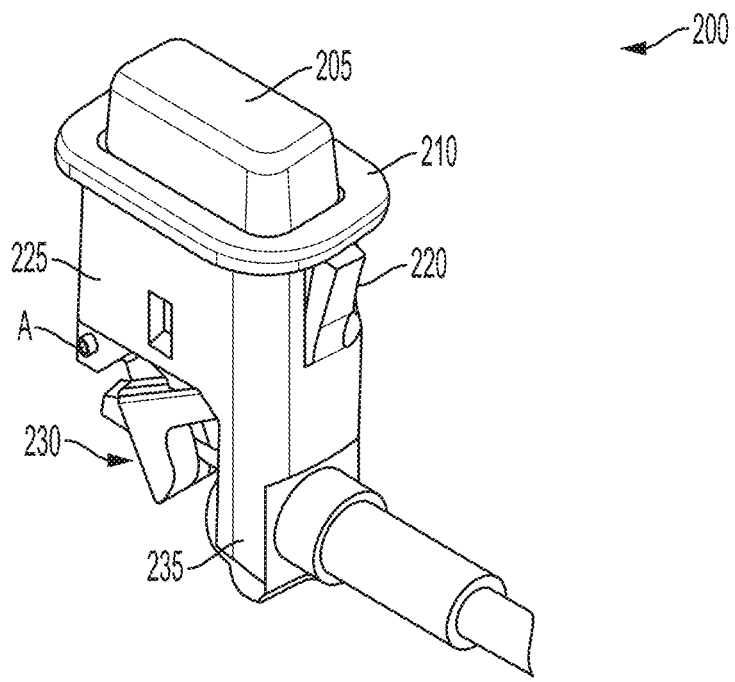
FIG. 2(b) is a top perspective view of the button assembly of FIG. 2(a)
Figure 2C:
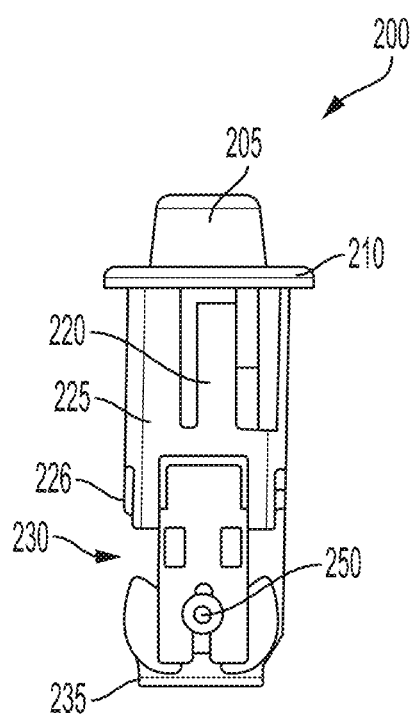
FIG. 2(c) is an end view of the button assembly of FIGS. 2(a) and 2(b)
Figure 2D:
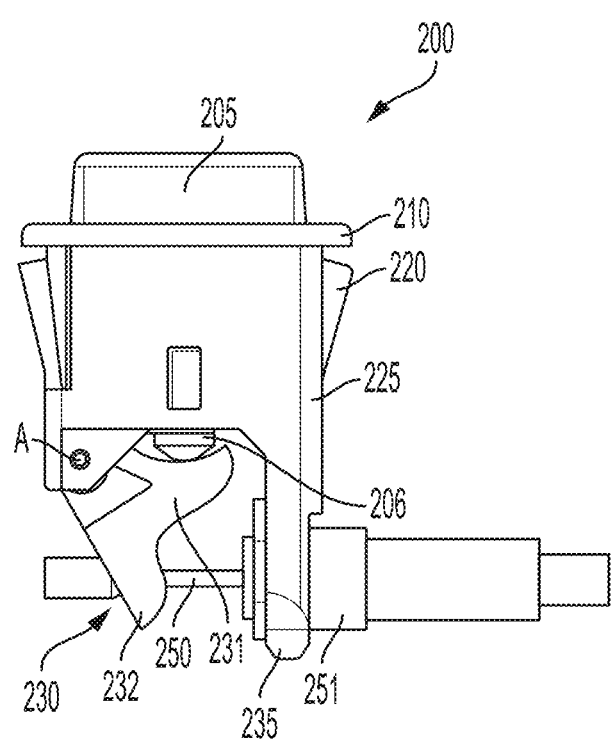
FIG. 2(d) is a side elevational view of the button assembly of FIGS. 2(a)-2(c)

FIG. 1 illustrates a powered seat assembly 101 (synonymously referred to as a "seat" for brevity), which is defined by a plurality of movable components. The seat 101 can be mounted to the floor of an aircraft cabin, e.g., by a mounting bracket supporting an actuator 108G, which in turn supports a seat frame 122. The seat 101 includes a passenger control unit, such as a keypad 104 disposed on an armrest 142, a controller 186 and one or more actuators 108A-108E and 108G (collectively or individually referred to as 108).

The seat 101 includes a back support 114, a seat pan 116 having a rearward portion 161 associated with the back support 114, and a forward portion 162 in which a leg rest 110 is defined by a first end 171 associated with the forward portion 162 of the seat pan 116 and a foot rest 112. Each of the back support 114, the seat pan 116, and the leg rest 110 are movable along a predetermined path of travel. Corresponding actuators 108A, 108C, 108D are configured to move the back support 114, the seat pan 116 and the leg rest 110, respectively, in response to one or more time-varying motion command(s) from a controller 186 or 187. The seat frame 122 can support the back support 114, the seat pan 116, the leg rest 110, or other components of the seat 101, either directly or via mounting brackets or other components.

Each of the actuators 108 can include, e.g., a full-size rotary actuator, a compact rotary actuator, a full-size thru-shaft linear actuator, a full-size extension-shaft actuator, or a compact extension-shaft linear actuator, depending on the application for which the actuator is used. Linear actuators can include rack-and-pinion structures or lead screws. Actuators can include friction brakes, electrically released friction brakes, or other structures to hold position when not in motion. In addition, each actuator can include one or more position determining devices such as a transducer or sensor.

For example, the actuator 108B controls a lumbar bladder 120 in the back support 114 that is operated by a pump (not shown) to selectively inflate or deflate the bladder 120. Actuator 108D is a linear-type actuator which is used to move the leg rest 110 over an angular range of motion. More specifically, the actuator 108D drives a bar 150 connected to a pivot 151 that is mounted to the leg rest 110. Actuator 108E axially moves a bar 152 that is configured to move the foot rest 112 and the actuator 108A moves the reclining back support 114 of the seat 101 from a substantially vertical position to a substantially horizontal position. The actuator 108A, which can be a linear or rotary actuator, moves a bar 154, which applies a torque via a pivot 155 to the back support 114 around the axis of rotation of the back support 114.

Actuator 108C axially moves the seat pan 116. As shown, the actuator 108C drives a bar 156, the latter component being mounted in the seat pan 116.

Actuator 108G includes a sensor 123 that reports the position of the seat frame 122 with respect to the actuator 108G or the cabin floor to controller 186 via controller 187.

The herein described control assembly enables several features of the aircraft seat to be controlled, either individually or systemically. Further details of this control assembly are described in U.S. Pat. No. 9,481,466, which is herein incorporated by reference in its entirety.

FIGS. 2(a)-2(d) illustrate an exemplary control mechanism that is configured for controlling a single aspect of an aircraft seat and more specifically the inclination of a back support. The control mechanism includes a button assembly 200 that includes an actuable button 205, a button housing 225 and one or more flexible operating members 220, as well as an outer cap or cover portion 210. The actuable button 205 is selectively used by the occupant of the seat to control the incline of the seat in which the flexible operating members 220 are configured to compress during installation of the button assembly 200 into an opening formed in the arm rest and then expand to a nominal position once the button assembly 200 has been fully advanced into the arm rest opening.

The button assembly 200 includes a wire rope activator 230 and a sleeve/conduit holder 235, attached at a lower end of the button housing 225. When installed, the wire rope activator 230 includes a first engagement arm 231 that is initially disposed in relation to a lower shaft-like portion 206 of the actuable button 205 and a second engagement arm 232 having a through opening that supports a portion of a wire rope 250, the latter being further housed within a sleeve or conduit 251. In operation, pressing the actuable button 205 will cause the lower portion of the button 205 to contact the first engagement arm 231 of the wire rope activator 230, the latter being pivotally attached by means of a pinned bracket 226 to the button housing 225 at a pivot point A. When engaged, the wire rope activator 230 according to this embodiment rotates clockwise, causing the supported wire rope 250 to move from a first position to a second position (to the left as viewed in FIG. 2(*d*)). In the meantime, the sleeve/conduit 251 is held in place by the sleeve/conduit holder 235 during this movement. Further details relating to this control mechanism are found in U.S. Pat. No. 10,829, 223, which is herein incorporated by reference in its entirety.

Figure 4A:
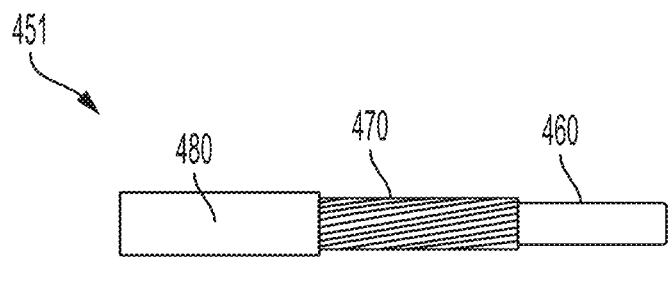
FIG. 4(a) is a side elevational and sectioned view of a conduit for a control cable assembly made in accordance with aspects of the invention.
Figure 4B:
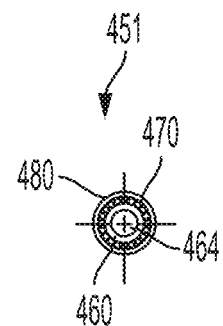
FIG. 4(b) is an end view of the conduit of FIG. 4(a)
Figure 4C:
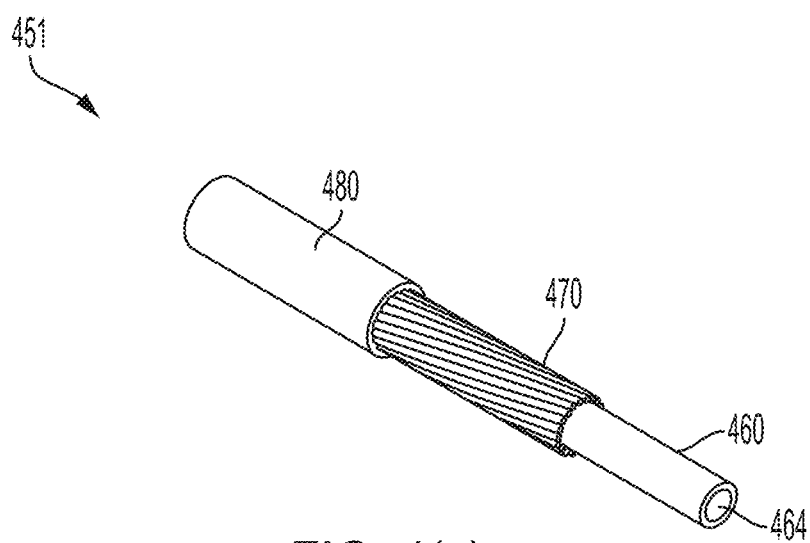
FIG. 4(c) is a top perspective view of the conduit of FIGS. 4(a) and 4(b).

A conduit or sleeve 451 for a control cable, such as previously described, is shown in FIG. 4 in accordance with an exemplary embodiment. More specifically, the conduit 451 is defined by three (3) primary components, namely an inner core 460, an intermediate set of support wires 470, and an outer sleeve or jacket 480.

According to this exemplary embodiment, the inner core 460 is defined by a cylindrical hollow cross section including an inner through opening 464 that is appropriately sized and configured to receive the movable control cable component (not shown in this view) of the control cable assembly. According to this specific embodiment, the inner core 460 is made from polytetrafluoroethylene (PTFE), although it will be understood that the inner core can 460 be made from other suitable structural materials. The plurality of support wires 470 are radially disposed about the inner core 460 and tightly packed into a circumferential configuration. According to this embodiment, the support wires 470 are made from a spring tempered alloy steel, such as AISI 1065. It will be understood, however, that other suitable materials can be utilized.

The outer sleeve 480 covers the plurality of support wires 470 and the inner core 460. In prior versions, the outer sleeve 480 of the conduit 451 has been made from nylon. The promulgation of increased flame resistance standards, however, seriously curtails the flexibility of this material when further processed to include a flame retardant additive that is designed to meet the standards, as well as the ability to successfully extrusion mold onto the remainder of the conduit. In order to conform to the more stringent flame resistance standards, it has been determined that certain polymeric materials can be treated with a flame retardant additive that enables greater plastic deformation and manufacturability, particularly the ability to extrusion mold the material. According to this present invention, the outer sleeve 480 is made from a polyolefin that is treated with a flame retardant additive. More specifically, the outer sleeve 480 is a polyolefin-based, highly flame retardant, zero halogen compound. This material has an oxygen index of 43, Testing has indicated at least a 50 percent improvement in bendability of the conduit without impacting friction of the contained wire rope. In a further preferred version, the conduit material is a polyolefin-based, highly flame retardant, zero halogen compound with extra scratch and mar resistance, the material further having an Oxygen index of 54 and including a self-extinguishing additive in addition to the flame retardant additive.

Figure 3A:
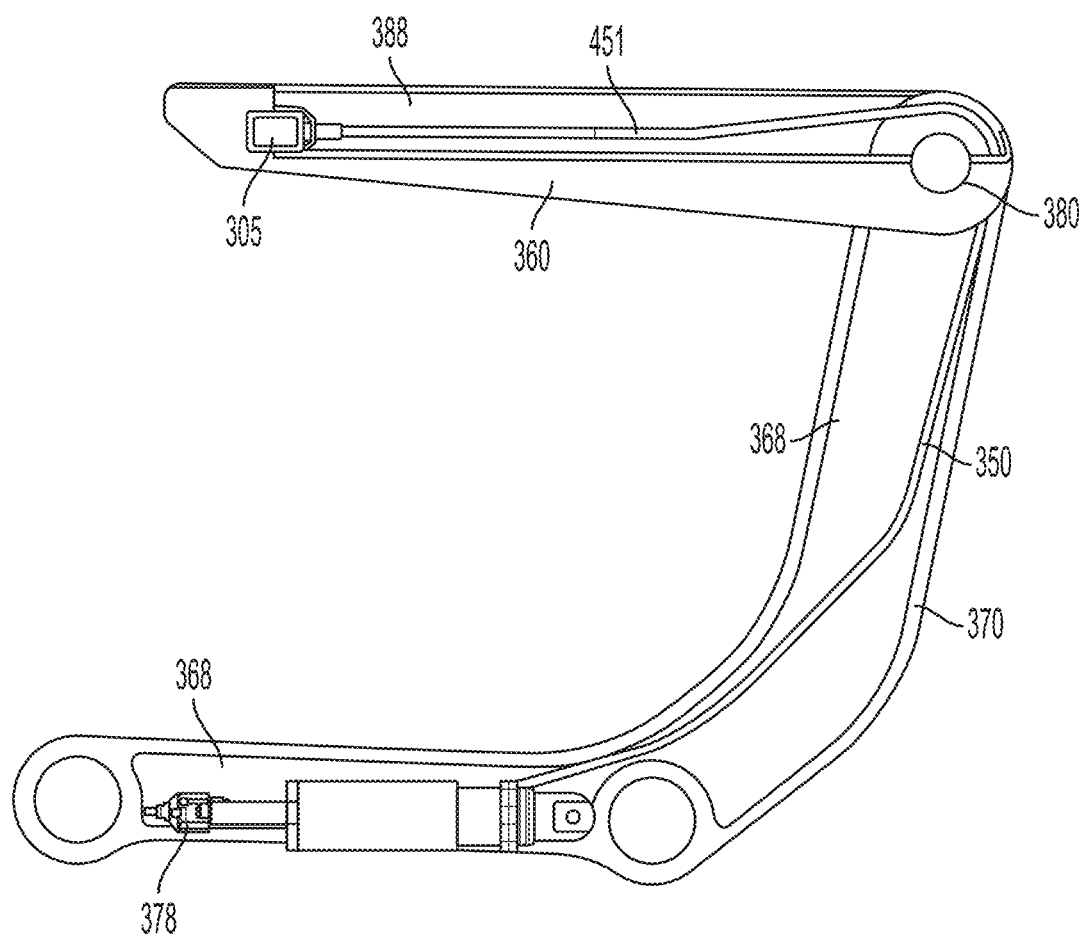
FIG. 3(a) is a partial assembly view of an arm rest assembly for an aircraft seat, including a retained control assembly.
Figure 3B:
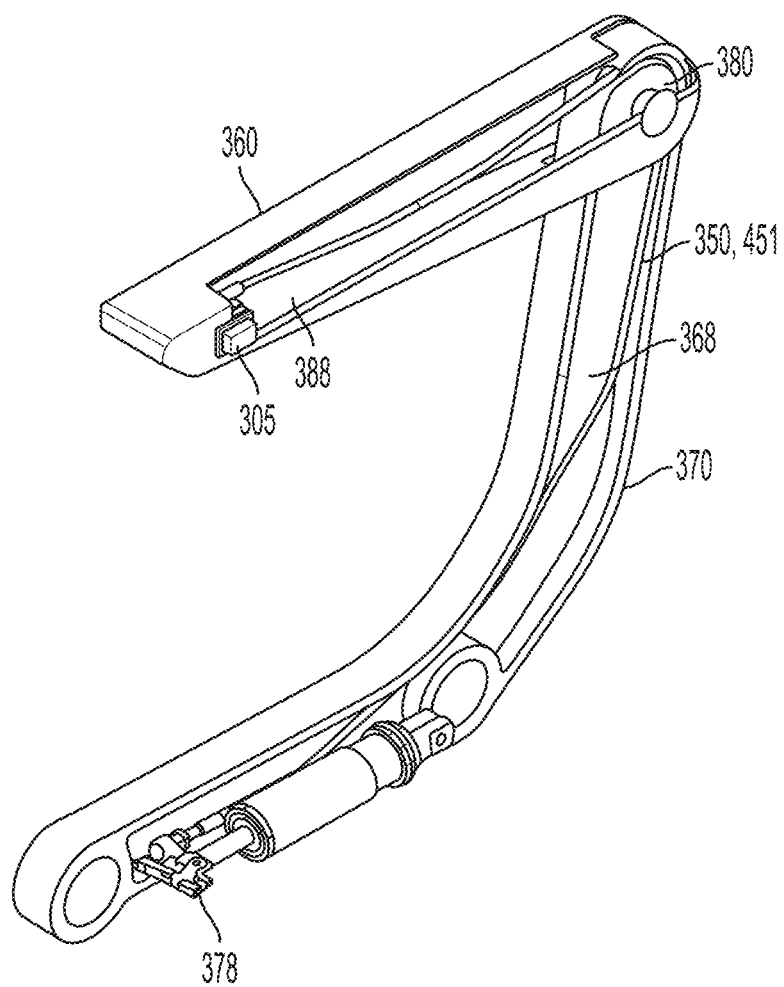
FIG. 3(b) is another partial assembly view of the arm rest assembly of FIG. 3(a)
Figure 3C:
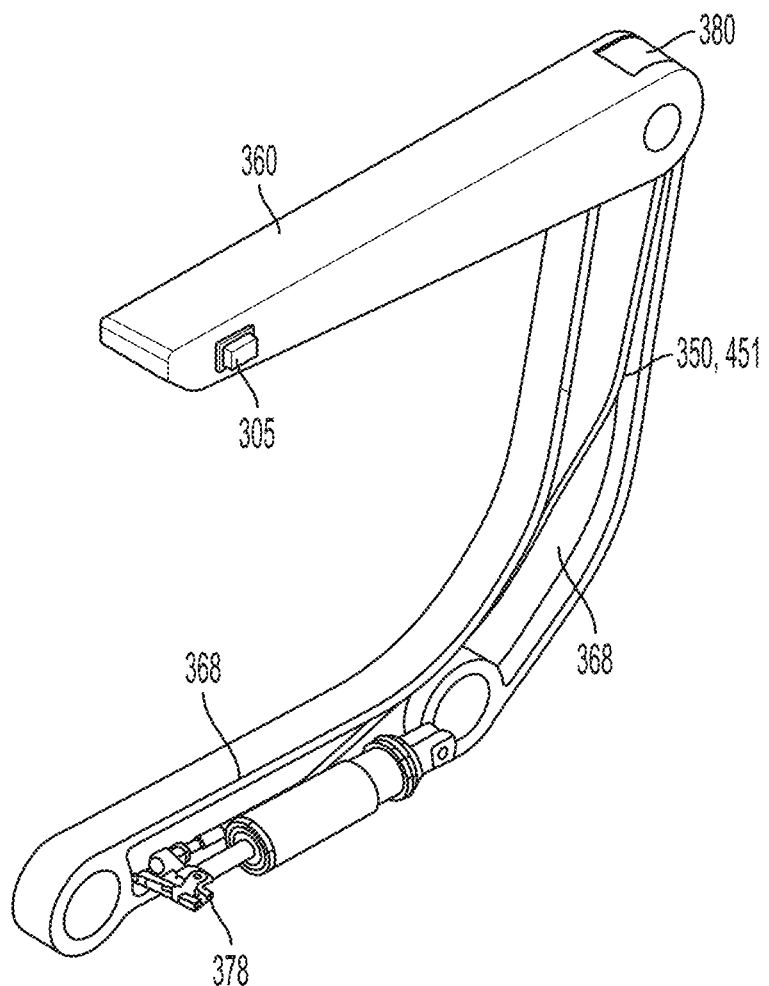
FIG. 3(c) is another partial assembly view of the arm rest assembly seat of FIGS. 3(a) and 3(b)

With reference to FIGS. 3(*a*)-3(*c*), the packaging of a control cable 350 for an aircraft seat control mechanism, such as the preceding control mechanisms or a similar version, is further shown within an arm rest assembly of the aircraft seat. For purposes of this discussion, only the arm rest assembly is shown in which the control cable 350 includes the improved conduit or sleeve 451. The arm seat assembly includes an arm rest 360 that is movable between respective horizontal and vertical positions via an arm pivot 380 disposed at one end of the movable arm rest 360 in relation to the remainder of the arm rest assembly. This remainder includes a frame portion 370 that is fixedly attached to the aircraft seat. The arm rest assembly is substantially hollow wherein the length of the control cable 350, including the conduit/sleeve 451, is retained within the confines of an arm rest cavity 388 of the arm rest 360, extending to an defined enclosure 368 of the fixed portion 370 of the arm rest assembly by routing the conduit 451 over (or under) the arm rest 360. The movable arm rest 360 retains an actuable button 305, similar to that previously described in FIGS. 2(*a*)-2(*d*), with one end of the contained control cable 350 being coupled to the button assembly 200, in a manner as previously described, and the remaining end of the control cable 350 being retained in relation to an actuator 378 provided at a lower end of the enclosure 368 within the fixed portion 370 of the arm rest assembly. In typical use and while the movable arm rest 360 is in a horizontal position, as shown, the actuation of the button 305 causes one end of the movable control cable 350 to be pulled while the opposing end retained by the actuator 378 and further linked to a control component (not shown) is also pulled, thereby enabling seat adjustment.

For egress and other purposes, the movable arm rest 360 can be raised via the arm pivot 380 relative to the fixed frame portion 370 of the arm rest assembly to a vertical position (not shown). When this movement occurs, the distance between the actuable button 305 and the actuator 378 changes. In this specific example, this latter distance is actually reduced due to the routing of the conduit 451 over the arm pivot 380. Since the length of the control cable 350 is not variable, the corresponding change in distance is accommodated as the conduit 451 is forced to snake within the arm rest cavity 488 between the actuable button 305 and the arm pivot 480 when the movable arm rest 360 is raised.

Alternatively, the conduit 451 could be routed below the arm pivot 380 and would have a similar distance change when the movable arm rest 360 is raised from its nominal horizontal position. In this latter case, the change in length actually increases the distance between the actuable button 305 and the actuator 378 when the arm rest 360 is raised. The change in length in is once again accommodated as the conduit 451 is forced to snake (wrinkle) in the arm rest cavity 380 of the arm rest 360, but in this instance the bending of the conduit occurs only when the arm rest is being moved from the vertical raised position to the horizontal nominal position. Additionally, the conduit 451 will create a resistance in the motion of the arm rest 360, when lowered. Utilizing a conduit design 451 shown in FIG. 4, creates sufficient flexibility for the conduit, to enable which can be caused to wrinkle or deform plastically over time. That is, the improved conduit 451 has sufficient flexibility to minimize or at least substantially reduce the resistance of the conduit to snake or wrinkle, thereby lowering the resistance to either raise or lower the arm rest 360 and further leading to an overall improvement in cycle life. At the same time, the control cable 350 having the improved conduit 451 more than adequately meets the more stringent flame resistant standards mandated by the industry.

PARTS LIST FOR FIGS. 1-4 (*C*)

101 powered seat assembly (seat)
104 keypad
108A-108E and 108G (108) actuator
110 leg rest
112 foot rest
114 back support
116 seat pan 120 lumbar bladder, back support
122 seat frame
123 sensor
142 arm rest
150 bar
151 pivot
152 bar
154 bar
155 pivot
156 bar
161 rearward portion, seat pan
162 forward portion, seat pan
171 first end, leg rest
186 controller
187 controller
200 button assembly
205 actuable button
206 lower shaft-like portion
210 cap or cover portion
220 flexible retaining members
225 button housing
230 wire rope activator
231 first engagement arm
232 second engagement arm
235 wire rope holder
250 wire rope
251 conduit or sleeve
305 actuable button
350 control cable
360 movable arm rest
368 enclosure
370 fixed frame portion, arm rest assembly
378 actuator
380 arm pivot
388 arm rest cavity
451 conduit or sleeve
460 inner core
464 center through opening
470 support wires
480 outer sleeve or jacket It will be readily apparent that other variations and modifications are possible, as described in accordance with the following claims.

The invention claimed is:

1. An assembly for controlling the recline position of an aircraft seat, the aircraft seat comprising an arm rest that is movable between respective horizontal and vertical positions via an arm pivot disposed at one end of the movable arm rest, the assembly comprising:
   a hollow frame portion fixedly secured to the aircraft seat;
   a control mechanism comprising:
      at least one user-actuable control member disposed on at least one of the arm rest or a seat panel of the aircraft seat;
      an actuator disposed within a lower portion of the hollow frame portion; and
      a control cable, the control cable being coupled to the at least one user-actuable control member at a first end and the actuator at an opposing second end and in which the control cable is further disposed over or under the arm pivot within the hollow frame portion, the control cable including a movable wire rope surrounded by a flexible conduit, the flexible conduit comprising:
         an inner core including a through opening sized for receiving the movable wire rope;
         a plurality of support wires disposed about the inner core; and
         an outer sleeve disposed about the plurality of support wires and the inner core, wherein the outer sleeve comprises a polymer material that has been treated with a flame-retardant additive, wherein the flexibility/bendability of the outer sleeve is not adversely affected by the flame-retardant additive.

2. The assembly of claim 1, wherein the outer sleeve of the flexible conduit is made from polyolefin.

3. The assembly of claim 1, wherein the outer sleeve further is treated with an additive that is self-extinguishing.

4. The assembly of claim 1, in which the outer sleeve of the flexible conduit is shrink fitted onto the plurality of support wires.

5. The assembly of claim 1, wherein the outer sleeve of the flexible conduit is extrusion molded onto the plurality of support wires and the inner core.

* * * * *